(12) United States Patent
Obergfell

(10) Patent No.: US 6,286,630 B1
(45) Date of Patent: Sep. 11, 2001

(54) SHOPPING CART BRAKE ASSEMBLY

(76) Inventor: Christopher M. Obergfell, 123 Pine St. #4, Danville, IL (US) 61832

( * ) Notice: Subject to any disclaimer, the term of this patent is extended or adjusted under 35 U.S.C. 154(b) by 0 days.

(21) Appl. No.: 09/572,884

(22) Filed: May 19, 2000

(51) Int. Cl.[7] .................................................. B62B 5/04
(52) U.S. Cl. ......................... 188/19; 188/2 D; 188/1.12; 188/20; 188/29
(58) Field of Search ................................. 188/19, 20, 29, 188/1.12, 2 D

(56) References Cited

U.S. PATENT DOCUMENTS

| | | |
|---|---|---|
| D. 362,529 | 9/1995 | Hilaire, Jr. et al. . |
| 2,638,183 * | 5/1953 | Prowinsky ............... 188/29 |
| 2,950,121 * | 8/1960 | Fisher ..................... 188/29 |
| 3,237,940 * | 3/1966 | Johnson .................. 188/29 |
| 3,409,105 * | 11/1968 | Clinton ................... 188/29 |
| 3,532,188 * | 10/1970 | Kelz ....................... 188/29 |
| 3,820,190 * | 6/1974 | Moller .................... 188/29 |
| 3,988,800 * | 11/1976 | Schser .................... 188/1.12 |
| 4,128,144 * | 12/1978 | Vasser .................... 188/29 |
| 4,768,622 | 9/1988 | Nicklasson et al. . |
| 4,815,161 * | 3/1989 | Timmer et al. .......... 188/1.12 |
| 4,840,388 | 6/1989 | Doughty . |
| 5,090,517 | 2/1992 | Doughty . |
| 5,242,035 * | 9/1993 | Lange .................... 188/1.12 |
| 5,499,697 | 3/1996 | Trimble et al. . |
| 5,603,517 * | 2/1997 | Lorman .................. 188/29 |
| 5,735,367 | 4/1998 | Brubaker . |

* cited by examiner

Primary Examiner—Robert J. Oberleitner
Assistant Examiner—Devon Kramer

(57) ABSTRACT

A shopping cart brake assembly for securing a shopping cart in place includes a cart that has at least one leg. A wheel is coupled to a distal end of the leg. A brake member extends from a hollow lower portion of the leg. A brake pad is coupled to the brake member. The brake pad is for frictionally engaging the wheel, thus preventing the wheel from rotating. In addition, a lever is coupled to the brake member for selectively extending the brake member.

15 Claims, 3 Drawing Sheets

SHOPPING CART BRAKE ASSEMBLY

BACKGROUND OF THE INVENTION

1. Field of the Invention

The present invention relates to braking mechanisms and more particularly pertains to a new shopping cart brake assembly for securing a shopping cart in place.

2. Description of the Prior Art

The use of braking mechanisms is known in the prior art. More specifically, braking mechanisms heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,735,367; U.S. Pat. No. 5,499,697; U.S. Pat. No. 4,768,622; U.S. Pat. No. 4,840,388; U.S. Pat. No. Des. 362,529; and U.S. Pat. No. 5,090,517.

While these devices fulfill their respective, particular objectives and requirements, the aforementioned patents do not disclose a new shopping cart brake assembly. The inventive device includes a cart that has at least one leg. A wheel is coupled to a distal end of the leg. A brake member extends from a hollow lower portion of the leg. A brake pad is coupled to the brake member. The brake pad is for frictionally engaging the wheel, thus preventing the wheel from rotating. In addition, a lever is coupled to the brake member for selectively extending the brake member.

In these respects, the shopping cart brake assembly according to the present invention substantially departs from the conventional concepts and designs of the prior art, and in so doing provides an apparatus primarily developed for the purpose of securing a shopping cart in place.

SUMMARY OF THE INVENTION

In view of the foregoing disadvantages inherent in the known types of braking mechanisms now present in the prior art, the present invention provides a new shopping cart brake assembly construction wherein the same can be utilized for securing a shopping cart in place.

The general purpose of the present invention, which will be described subsequently in greater detail, is to provide a new shopping cart brake assembly apparatus and method which has many of the advantages of the braking mechanisms mentioned heretofore and many novel features that result in a new shopping cart brake assembly which is not anticipated, rendered obvious, suggested, or even implied by any of the prior art braking mechanisms, either alone or in any combination thereof.

To attain this, the present invention generally comprises a cart that has at least one leg. A wheel is coupled to a distal end of the leg. A brake member extends from a hollow lower portion of the leg. A brake pad is coupled to the brake member. The brake pad is for frictionally engaging the wheel, thus preventing the wheel from rotating. In addition, a lever is coupled to the brake member for selectively extending the brake member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shopping cart brake assembly apparatus and method which has many of the advantages of the braking mechanisms mentioned heretofore and many novel features that result in a new shopping cart brake assembly which is not anticipated, rendered obvious, suggested, or even implied by any of the prior art braking mechanisms, either alone or in any combination thereof.

It is another object of the present invention to provide a new shopping cart brake assembly that may be easily and efficiently manufactured and marketed.

It is a further object of the present invention to provide a new shopping cart brake assembly that is of a durable and reliable construction.

An even further object of the present invention is to provide a new shopping cart brake assembly which is susceptible of a low cost of manufacture with regard to both materials and labor, and which accordingly is then susceptible of low prices of sale to the consuming public, thereby making such shopping cart brake assembly economically available to the buying public.

Still yet another object of the present invention is to provide a new shopping cart brake assembly which provides in the apparatuses and methods of the prior art some of the advantages thereof, while simultaneously overcoming some of the disadvantages normally associated therewith.

Still another object of the present invention is to provide a new shopping cart brake assembly for securing a shopping cart in place.

Yet another object of the present invention is to provide a new shopping cart brake assembly which includes a cart that has at least one leg. A wheel is coupled to a distal end of the leg. A brake member extends from a hollow lower portion of the leg. A brake pad is coupled to the brake member. The brake pad is for frictionally engaging the wheel, thus preventing the wheel from rotating. In addition, a lever is coupled to the brake member for selectively extending the brake member.

Still yet another object of the present invention is to provide a new shopping cart brake assembly that is easy to use.

Even still another object of the present invention is to provide a new shopping cart brake assembly that would save a shopper time and effort when loading and unloading groceries.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
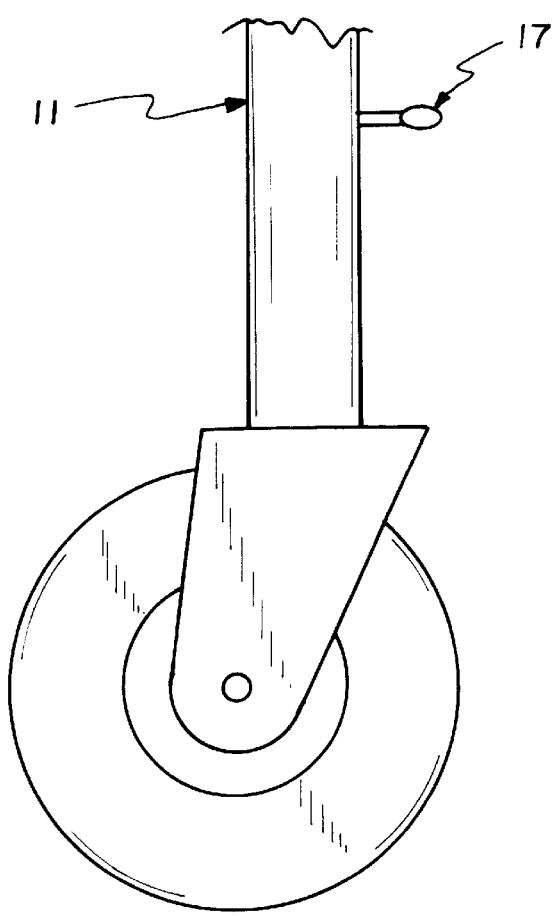
FIG. 1 is a schematic front view of a new shopping cart brake assembly according to the present invention.
Figure 2:
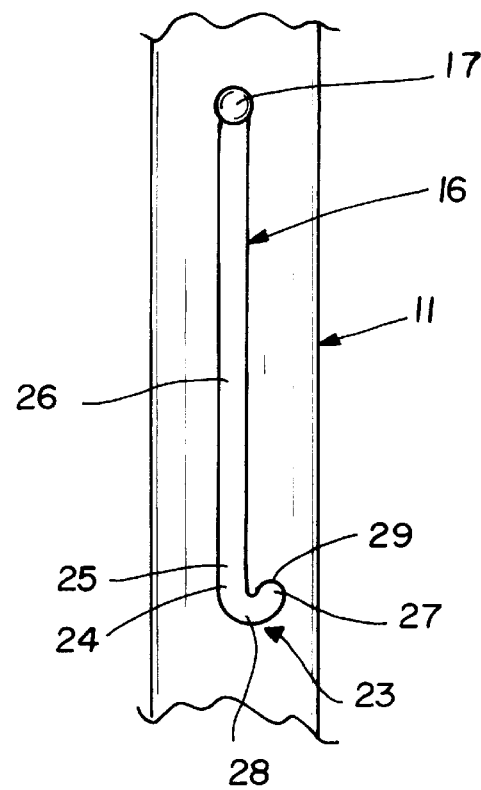
FIG. 2 is a schematic side view of the present invention, illustrating a slot in the leg.
Figure 3:
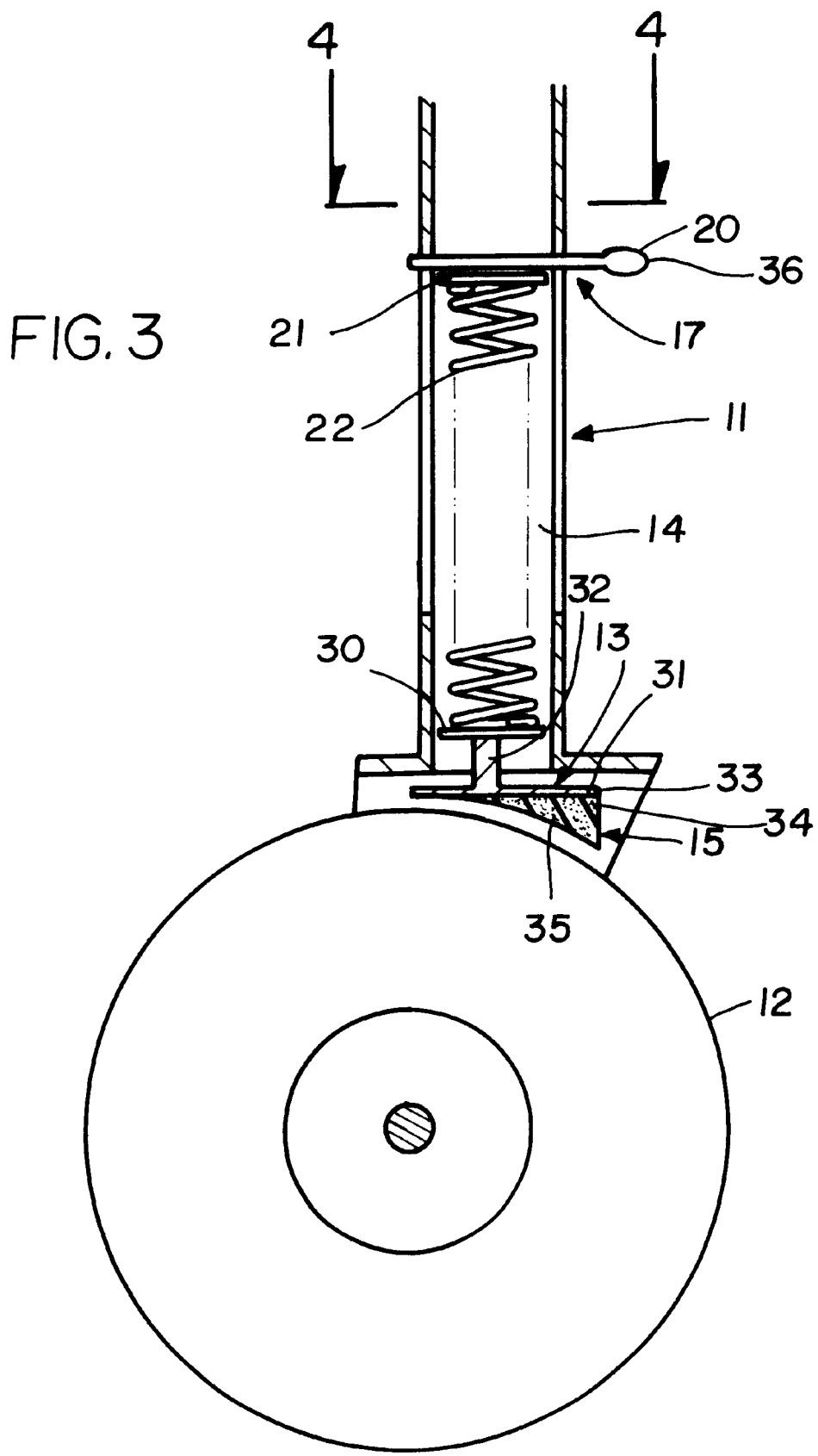
FIG. 3 is a schematic cross-sectional front view of the present invention.
Figure 4:
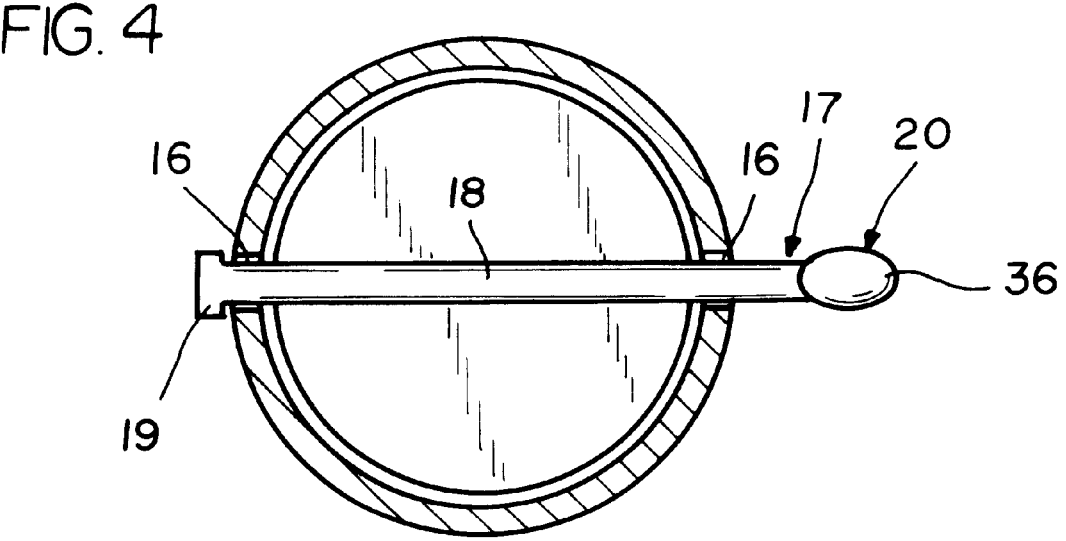
FIG. 4 is a schematic cross-sectional top view of the present invention, illustrating the lever.
Figure 5:
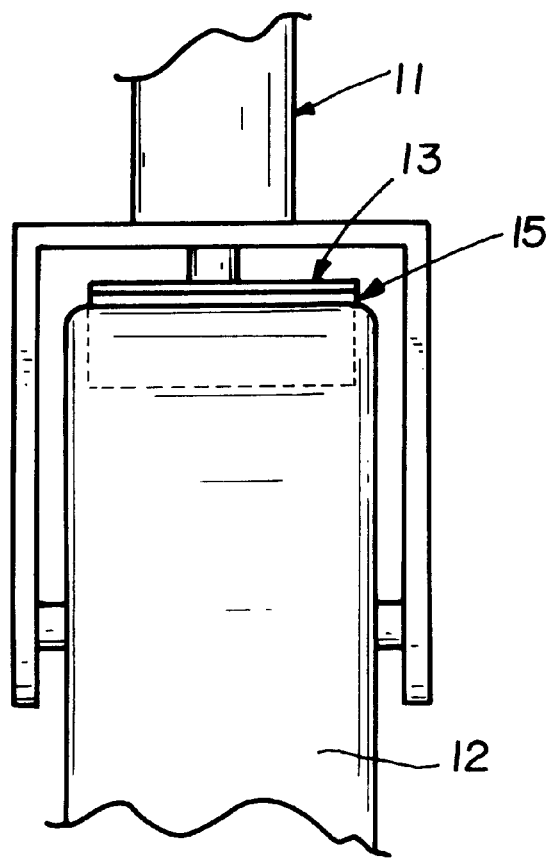
FIG. 5 is a schematic side view of the present invention.

With reference now to the drawings, and in particular to FIGS. 1 through 5 thereof, a new shopping cart brake assembly embodying the principles and concepts of the present invention and generally designated by the reference numeral 10 will be described.

As best illustrated in FIGS. 1 through 5, the shopping cart brake assembly 10 generally comprises a cart that has at least one leg 11, a wheel 12 and a brake member 13. The wheel 12 is coupled to a distal end of the leg 11 and the brake member 13 is selectively engaged to the wheel 12.

The brake member 13 extends from a hollow lower portion 14 of the leg. A brake pad 15 is coupled to the brake member 13. The brake pad 15 is designed to frictionally engage the wheel 12 thereby preventing the wheel 12 from rotating. The brake pad 15 has a substantially planar upper face 33 that is coupled to the braking member 13. The brake pad 15 also has a substantially planar vertical edge 34 that extends down from the planar upper face 33. In addition, the brake pad has an arcuate wheel engaging face 35 for frictionally engaging the wheel 12.

The hollow lower portion 14 of the leg 11 has a pair of aligned slots 16. A lever 17 is coupled to the brake member 13 for selectively extending the brake member 13. The lever 17 has an interior portion 18 that is positioned in the hollow lower portion 14 of the leg 11. The lever 17 further has a tail end portion 19 that extends out through a first one of the pair of slots 16 in the leg 11. In addition, the lever 17 has head portion 20 that extends outwardly through a second one of the slots 16 in the hollow lower portion 14 of the leg 11. The head portion 20 of the lever 17 has a bulbous end 36 for facilitating manipulation of the lever 17.

A bearing plate 21 is positioned adjacent to the interior portion 18 of the lever 17. The bearing plate 21 is designed to freely slide within the hollow lower portion 14 of the leg 11. A biasing member 22 is positioned in the hollow lower portion 14 of the leg 11. The biasing member 22 extends between the bearing plate 21 and the brake member 13. Thus the biasing member 22 is compressed when the lever 17 is moved in the slot 16 to extend the braking member 14.

The braking member 13 has a biasing member bearing plate 30, a brake pad plate 31, and an extension portion 32. The extension portion 32 extends between the biasing member bearing plate 30 and the brake pad plate 31. The biasing member bearing plate 30 of the braking member is engaged with the biasing member 22.

Each of the slots 16 has a catch portion 23 at a lower end 25 of the slot 16. The catch portion 23 is for holding the biasing member 22 in a compressed position. When the biasing member 22 is in a compressed position, the braking member 13 is held in frictional engagement with the wheel 12.

Each catch portion 23 has generally a semi-circular shape with a first end 24 in communication with the lower end 25 of a vertical portion 26 of an associated one of the slots 16. In addition, a second end 27 of the catch portion 23 extends upwardly from a medial portion 28 of the catch portion 23 such that the second end 27 is positioned in a laterally spaced relation to the vertical portion 26 of the associated slot 16. The second end 27 of each catch portion 23 of the associated slot 16 has a bearing wall 29 for abutting the lever 16 when the lever 17 compresses the biasing member 22.

In use, the brake pad 15 frictionally engages the wheel 12 by sliding the lever 17 in the slots 16 into the catch portion 23 of the slots 16. A foot of a user may activate the lever 17 along the slots 16. When the brake pad 15 is frictionally engaged to the wheel 12 the cart is held in place. To release the brake pad 15, the lever is simply moved from the catch portion 23 of the slots 16. Once the lever 17 is moved from the catch portion 23, the biasing member 22 returns the lever 17 to its original position thereby disengaging the brake pad 15 from the wheel 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cart braking assembly comprising:
   a cart having at least one leg, said cart having a wheel coupled to a distal end of said leg;

a brake member extendable from a hollow lower portion of said leg;

a brake pad coupled to said brake member, said brake pad being for frictionally engaging said wheel for preventing said wheel from rotating whereby said cart is prevented from moving; and a lever coupled to said brake member for selectively extending said brake member;

said hollow lower portion of said leg having a slot;

said lever having an interior portion positioned in said hollow lower portion of said leg, said lever further having a head portion extending outwardly through said slot in said hollow lower portion of said leg;

a biasing member positioned in said hollow lower portion of said leg, said biasing member being coupled to extend between said interior portion of said lever and said brake member whereby said biasing member is compressed when said lever is moved in said slot to extend said braking member.

2. The cart braking assembly of claim 1, further comprising:

said slot having a catch portion at a lower end of said slot for holding said biasing member in a compressed position whereby said braking member is held in frictional engagement with said wheel.

3. The cart braking assembly of claims 2, further comprising:

said catch portion comprising a generally semi-circular shape having a first end in communication with a lower end of a vertical portion of said slot and a second end extending upwardly from a medial portion of said catch portion such that said second end is positioned in laterally spaced relation to said vertical portion of said slot.

4. The cart braking assembly of claim 3, further comprising:

said second end of said catch portion of said slot having a bearing wall for abutting said lever when said lever compresses said biasing member.

5. The cart braking assembly of claim 1, further comprising:

said braking member having a biasing member bearing plate, a brake pad plate, and an extension portion extending between said biasing member bearing plate and said brake pad plate.

6. The cart braking assembly of claim 1, further comprising:

said brake pad having a substantially planar upper face coupled to said braking member, a substantially planar vertical edge extending downwardly from said planar upper face, and an arcuate wheel engaging face for frictionally engaging said wheel.

7. The cart braking assembly of claim 1, further comprising:

said head portion of said lever having a bulbous end for facilitating manipulation of said lever.

8. A cart braking assembly comprising:

a cart having at least one leg, said cart having a wheel coupled to a distal end of said leg;

a brake member extendable from a hollow lower portion of said leg;

a brake pad coupled to said brake member, said brake pad being for frictionally engaging said wheel for preventing said wheel from rotating whereby said cart is prevented from moving; and a lever coupled to said brake member for selectively extending said brake member;

said hollow lower portion of said leg having a pair of aligned slots;

said layer having an interior portion positioned in said hollow lower portion of said leg, said lever further having a tail end portion extending out through a first one of said pair of slots in said leg and a head portion extending outwardly through a second one of said slots in said hollow lower portion of said leg;

a bearing plate postioned adjacent to said interior portion of said lever, said bearing plate being free to slide within said hollow lower portion of said leg;

a biasing member positioned in said hollow lower portion of said leg, said biasing member being coupled to extend between said bearing plate and said brake member whereby said biasing member is compressed when said lever is moved in said slot to extend said braking member.

9. The cart braking assembly of claim 8, further comprising:

each of said slots having a catch portion at a lower end of said slot for holding said biasing member in a compressed position whereby said braking member is held in frictional engagement with said wheel.

10. The cart braking assembly of claim 9, further comprising:

each said catch portion comprising a generally semi-circular shape having a first end in communication with a lower end of a vertical portion of an associated on of said slots and a second end extending upwardly from a medial portion of said catch portion of said associated slot such that said second end is positioned in laterally spaced relation to said vertical portion of said associated slot.

11. The cart braking assembly of claim 10, further comprising:

said second end of each said catch portion of said associated slot having a bearing wall for abutting said lever when said lever compresses said biasing member.

12. The cart braking assembly of claim 8, further comprising:

said braking member having a biasing member bearing plate, a brake pad plate, and an extension portion extending between said biasing member bearing plate and said brake pad plate.

13. The cart braking assembly of claim 8, further comprising:

said brake pad having a substantially planar upper face coupled to said braking member, a substantially planar vertical edge extending downwardly from said planar upper face, and an arcuate wheel engaging face for frictionally engaging said wheel.

14. The cart braking assembly of claim 8, further comprising:

said head portion of said lever having a bulbous end for facilitating manipulation of said lever.

15. A cart braking assembly comprising:

a cart having at least one leg, said cart having a wheel coupled to a distal end of said leg;

a brake member extendable from a hollow lower portion of said leg;

a brake pad coupled to said brake member, said brake pad being for frictionally engaging said wheel for preventing said wheel from rotating whereby said cart is prevented from moving;

a lever coupled to said brake member for selectively extending said brake member;

said hollow lower portion of said leg having a pair of aligned slots;

said lever having an interior portion positioned in said hollow lower portion of said leg, said lever further having a tail end portion extending out through a first one of said pair of slots in said leg and a head portion extending outwardly through a second one of said slots in said hollow lower portion of said leg;

a bearing plate positioned adjacent to said interior portion of said lever, said bearing plate being free to slide within said hollow lower portion of said leg;

a biasing member positioned in said hollow lower portion of said leg, said biasing member being coupled to extend between said bearing plate and said brake member whereby said biasing member is compressed when said lever is moved in said slot to extend said braking member;

each of said slots having a catch portion at a lower end of said slot for holding said biasing member in a compressed position whereby said braking member is held in frictional engagement with said wheel;

each said catch portion comprising a generally semi-circular shape having a first end in communication with a lower end of a vertical portion of an associated on of said slots and a second end extending upwardly from a medial portion of said catch portion of said associated slot such that said second end is positioned in laterally spaced relation to said vertical portion of said associated slot;

said second end of each said catch portion of said associated slot having a bearing wall for abutting said lever when said lever compresses said biasing member;

said braking member having a biasing member bearing plate, a brake pad plate, and an extension portion extending between said biasing member bearing plate and said brake pad plate;

said brake pad having a substantially planar upper face coupled to said braking member, a substantially planar vertical edge extending downwardly from said planar upper face, and an arcuate wheel engaging face for frictionally engaging said wheel; and said head portion of said lever having a bulbous end for facilitating manipulation of said lever.

\* \* \* \* \*